United States Patent
Wu et al.

(10) Patent No.: US 6,817,774 B2
(45) Date of Patent: Nov. 16, 2004

(54) METHOD AND APPARATUS FOR AUTOMATICALLY DYNAMICALLY ADJUSTING PRESTRESSED BEARINGS OF SHAFT

(75) Inventors: Jinn-Fa Wu, Taichung (TW); Tsann-Huei Chang, Hsinchu (TW); Kuan-Wen Chen, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 284 days.

(21) Appl. No.: 10/026,821

(22) Filed: Dec. 27, 2001

(65) Prior Publication Data

US 2002/0186909 A1 Dec. 12, 2002

(30) Foreign Application Priority Data

Jun. 7, 2001 (TW) .................................... 90113757 A

(51) Int. Cl.[7] .......................... F16C 19/52; B21D 53/10
(52) U.S. Cl. .................... 384/557; 384/905; 29/898.07; 29/898.09; 29/898.14; 29/447
(58) Field of Search .................. 29/898.07, 898.09, 29/898.14, 898, 447; 384/543, 557, 493, 278, 905

(56) References Cited

U.S. PATENT DOCUMENTS

| | | | | |
|---|---|---|---|---|
| 2,324,676 A | * | 7/1943 | Butterfield | |
| 3,561,829 A | * | 2/1971 | Heldt | |
| 4,717,977 A | * | 1/1988 | Brown | |
| 6,398,418 B1 | * | 6/2002 | Chang et al. | |
| 6,599,022 B2 | * | 7/2003 | Obara | |
| 6,628,477 B1 | * | 9/2003 | Oelsch | |

* cited by examiner

Primary Examiner—Eric Compton
(74) Attorney, Agent, or Firm—Rabin & Berdo, P.C.

(57) ABSTRACT

Method and apparatus for automatically dynamically adjusting prestressed bearings of shaft are provided. The apparatus comprises a sleeve assembly having outer and inner sleeves sandwiched between the bearings. An inner diameter of outer sleeve is smaller than an outer diameter of inner sleeve. Hence, outer and inner sleeves are fitted together after cooling. Further, inner sleeve is compressed by the outer sleeve to extend axially. During rotation of shaft, the axial extension of inner sleeve is reduced because the radial expansion of outer sleeve is larger than that of inner sleeve due to an thermal expansion coefficient of outer sleeve larger than that of inner sleeve. This can reduce prestress of bearings without degrading a rigidity thereof.

8 Claims, 3 Drawing Sheets

METHOD AND APPARATUS FOR AUTOMATICALLY DYNAMICALLY ADJUSTING PRESTRESSED BEARINGS OF SHAFT

BACKGROUND OF THE INVENTION

1. Field of the Invention

The present invention relates to bearings of shaft and more particularly to a method and apparatus for automatically dynamically adjusting prestressed bearings of shaft.

2. Description of the Prior Art

As understood that how to develop and produce products having industrial applicability is an important thing to manufacturers. This is particularly true in the competition of machine tool manufacturing. In the case of high speed shaft of machine tool, now the manufacturing thereof is at a bottleneck due to higher precision requirement and wide applications. Such problem is caused by heat accumulation on shaft and bearings thereof during rotation, i.e., heat dissipation is not enough.

FIG. 1 is a block diagram showing heat generated in major components during rotation of a conventional shaft and bearings thereof. As shown, for maintaining rigidity and precision of shaft, a prestress is exerted on each bearing of shaft prior to rotation. This can increase friction between bearings and shaft. Accordingly, excessive heat is generated. Such excessive heat is partly transferred from motor. As such, components such as bearings or sleeve assemblies are expanded due to the heat. And in turn, prestress on bearings is increased. As a result, friction between bearings and shaft is further increased. Such cycle is repeated during the rotation of shaft. Eventually, bearings are malfunctioned.

A couple of techniques have been proposed to solve above problem:

1. Prestressed spring mounting: A compressed spring is coupled to bearing of shaft. Hence, a potential deformation of bearing may be absorbed by the expansion of spring during the high temperature operating environment. However, the previous design suffered from several disadvantages. For example, rigidity of shaft may be adversely affected. Also, it is difficult to control the precision of shaft. Moreover, it is not easy to choose an optimum spring having a desired elasticity coefficient, resulting in a poor reliability and non-uniform prestress distribution of bearing. Such spring-based improvement is limited in applications.

2. Hydraulic prestressed means: Hydraulic prestressed switching devices are most popular. However, this design still suffered from several disadvantages. For example, an additional hydraulic oil supply and associated equipment are required. This can increase cost. Further, such device is frequently malfunctioned. Furthermore, useful space is occupied by the device. Moreover, prestress of oil supply is subject to change during oil pumping cycle. To the worse, bearing may be damaged if there is a change of temperature of oil supply and/or oil leaking.

Thus, it is desirable to provide a method and apparatus for automatically dynamically adjusting prestressed bearings of shaft in order to overcome the above drawbacks of prior art.

SUMMARY OF THE INVENTION

It is therefore an object of the present invention to provide a method for automatically dynamically adjusting prestressed bearings of a shaft comprising the steps of a) forming a sleeve assembly comprising an outer sleeve and a first inner sleeve fitted together; b) selecting a thermal expansion coefficient of the outer sleeve larger than that of the first inner sleeve; c) machining surfaces of the outer and the first inner sleeves for making an inner diameter of the outer sleeve smaller than an outer diameter of the first inner sleeve; d) heating the outer sleeve at a predetermined temperature for expanding the inner diameter thereof to be larger than the outer diameter of the first inner sleeve prior to putting the outer sleeve onto the first inner sleeve; e) decreasing temperature of the outer and the first inner sleeves for securing them together; and f) mounting the sleeve assembly onto the shaft prior to sandwiching the sleeve assembly between the bearings, thereby exerting a predetermined prestress on each of the bearings. By utilizing this method, prestress reduction of bearings of shaft without degrading a rigidity of bearings is carried out. Further, no additional complex equipment is needed, resulting in a reduction in the manufacturing and maintenance costs and space saving.

It is another object of the present invention to provide an apparatus for automatically dynamically adjusting prestressed bearings of a shaft comprising a sleeve assembly sandwiched between the bearings and including an outer sleeve and a first inner sleeve fitted together wherein a thermal expansion coefficient of the outer sleeve is larger than that of the first inner sleeve, an inner diameter of the outer sleeve is smaller than an outer diameter of the first inner sleeve, the outer and the first inner sleeves are secured together in a room temperature, and the first inner sleeve is compressed by the outer sleeve to extend axially.

BRIEF DESCRIPTION OF THE DRAWINGS

The drawings disclose an illustrative embodiment of the present invention which serves to exemplify the various advantages and objects hereof, and are as follow.

DETAILED DESCRIPTION OF THE PREFERRED EMBODIMENTS

Figure 1:
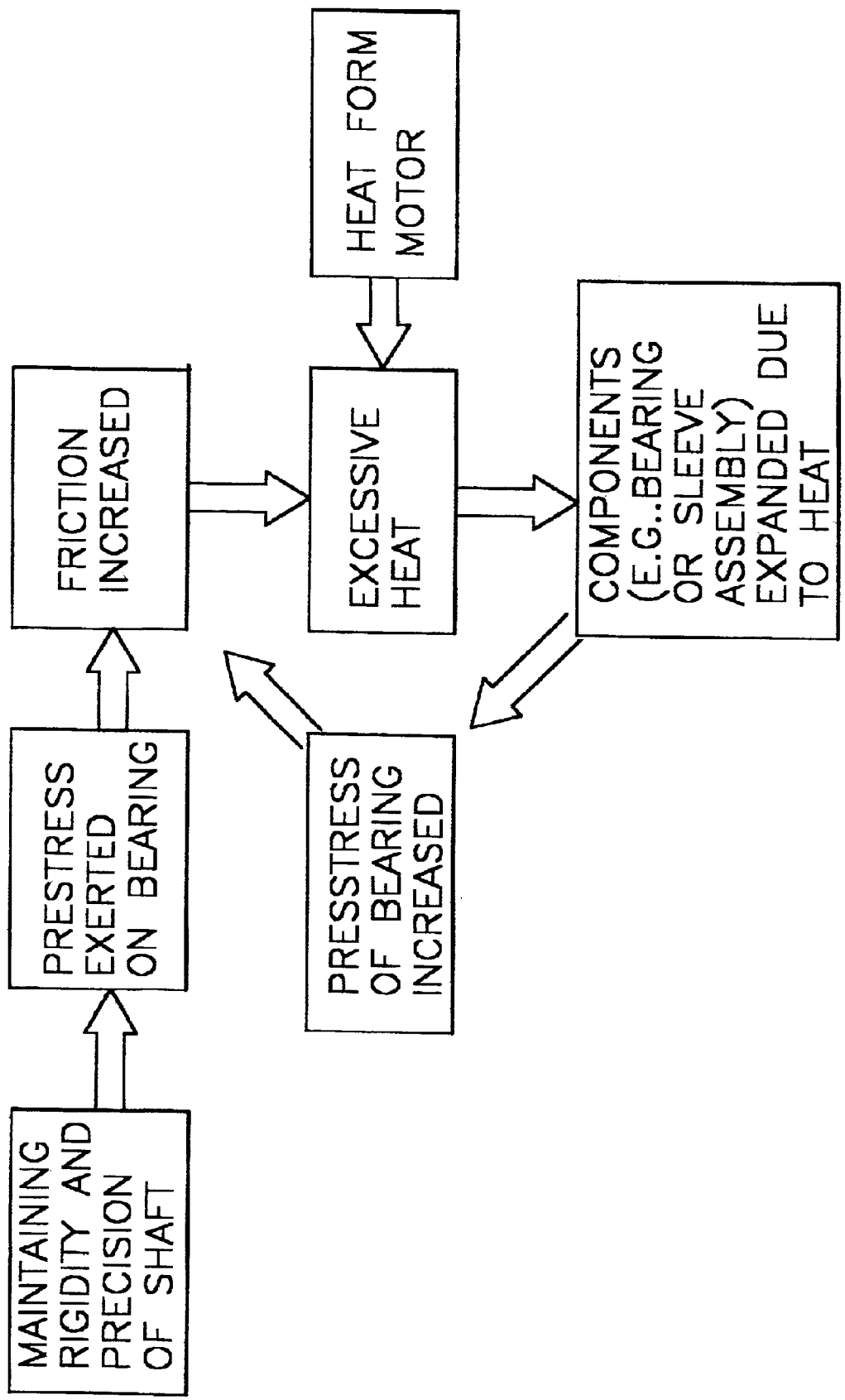
FIG. 1 is a block diagram showing heat generated in major components during rotation of a conventional shaft and bearings thereof.
Figure 2:
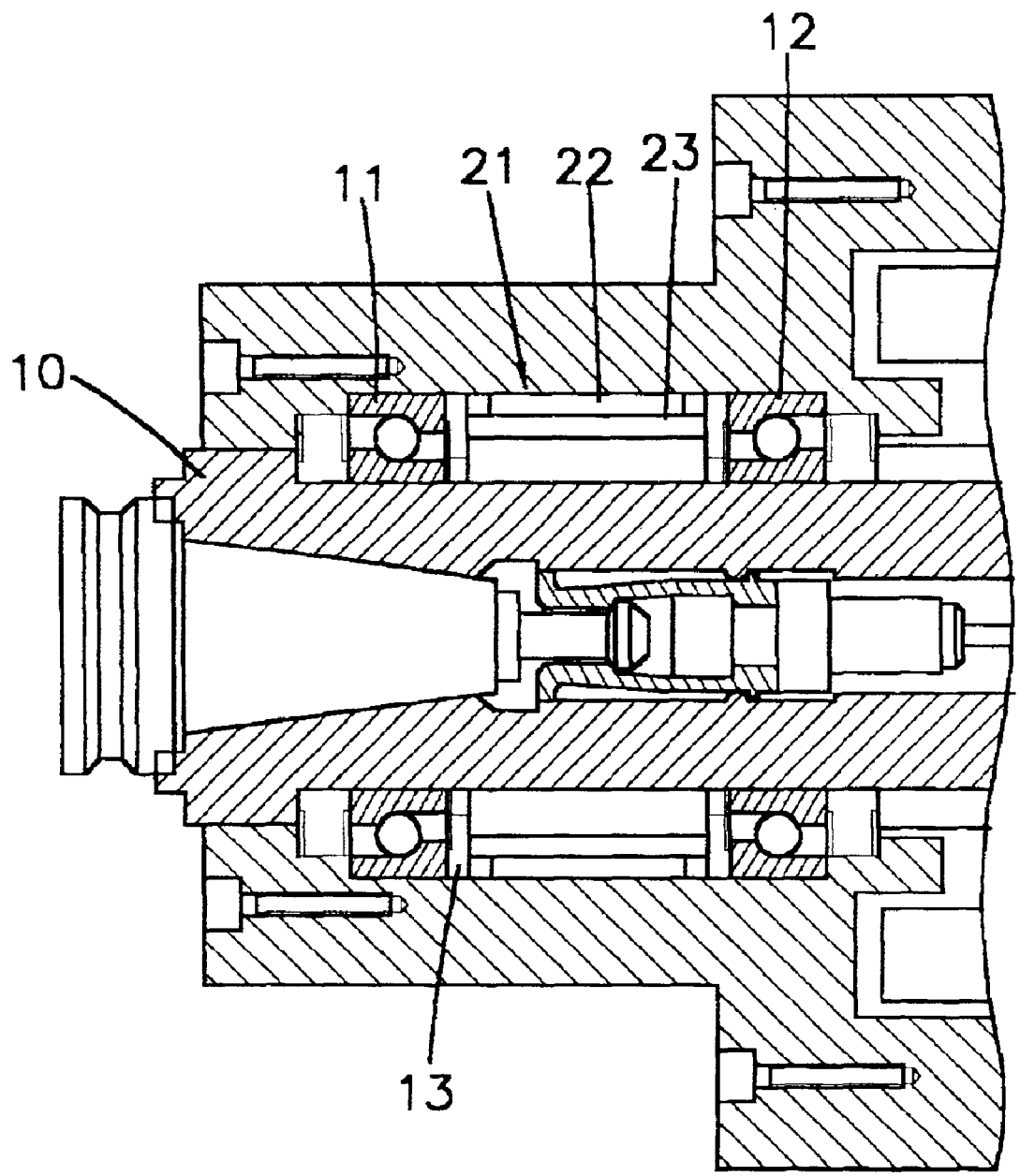
FIG. 2 is a cross-sectional view of an apparatus for automatically dynamically adjusting prestressed bearings of shaft according to the invention.
Figure 3A:
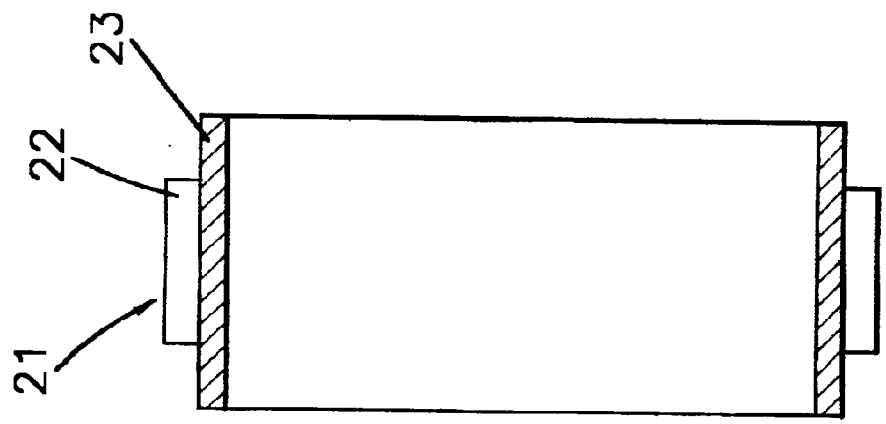
FIG. 3A is a cross-sectional view schematically showing a shape of sleeve assembly in a room temperature environment.
Figure 3B:
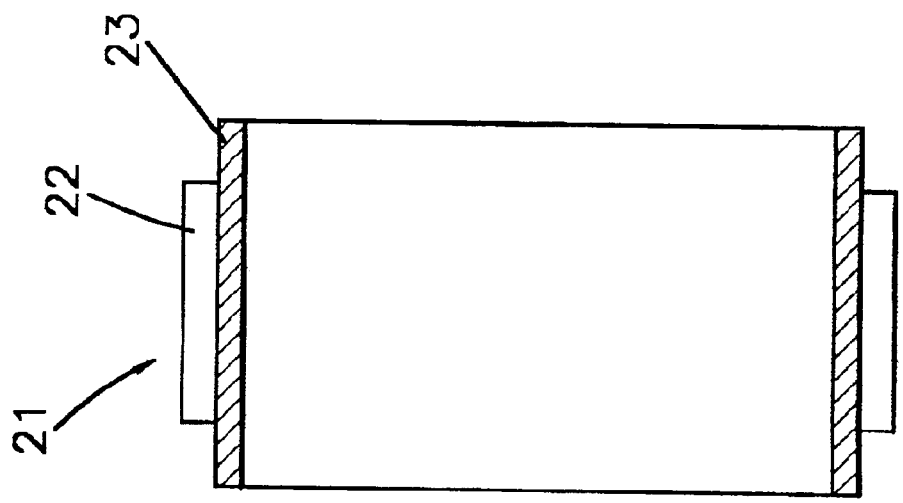
FIG. 3B is a cross-sectional view schematically showing a shape of sleeve assembly in a high temperature environment.

Referring to FIGS. 2, 3A, and 3B, there is shown an apparatus constructed in accordance with the invention wherein sleeve assembly 21 comprising an outer sleeve 22 and an inner sleeve 23 tightly fitted together is provided between bearings 11 and 12 which are put on shaft 10. A process for adjusting prestressed bearings of shaft of the apparatus comprises the steps of:

A. selecting a thermal expansion coefficient (e.g., $18.7 \times 10^{-6}/°$ C.) of outer sleeve (e.g., formed of brass) 22 larger than a thermal expansion coefficient (e.g., $1.6 \times 10^{-6}/°$ C.) of inner sleeve (e.g., Invar alloy) 23;

B. machining the surfaces of outer sleeve 22 and inner sleeve 23 for making an inner diameter of outer sleeve 22 smaller than an outer diameter of inner sleeve 23;

C. heating outer sleeve 22 at a predetermined temperature for expanding inner diameter thereof to be larger than outer diameter of inner sleeve 23 prior to putting outer sleeve 22 onto inner sleeve 23;

D. decreasing temperature of outer sleeve 22 and inner sleeve 23 for tightly fitting them together because the contraction of outer sleeve 22 is larger than that of inner sleeve 23 after cooled due to the thermal expansion coefficient of outer sleeve 22 larger than that of inner sleeve 23 (FIG. 3A) wherein an axial extension about 1.5 $\mu$m/60° C. temperature difference) of shaft is generated by the contraction of inner sleeve 23 onto outer sleeve 22 due to Poisson effect; and E. mounting sleeve assembly 21 onto shaft 10 prior to sandwiching sleeve assembly 21 between bearings 11 and 12 by two packings 13, thus exerting a predetermined prestress to each of the bearings 11 and 12 (FIG. 2).

Temperature of bearings 11 and 12 and sleeve assembly 21 increase as rotating speed of shaft 10 increases. Hence, generated heat is transferred to outer sleeve 22 and inner sleeve 23. Inner diameter of outer sleeve 22 will expand to be larger than outer diameter of inner sleeve 23 when outer sleeve 22 is subject to heat. This may reduce pressure exerted on inner sleeve 23, resulting in a reduction of the axial extension (FIG. 3B). At the same time, prestress of bearings 11 and 12 is reduced accordingly. Temperature of bearings 11 and 12 and sleeve assembly 21 decrease as rotating speed of shaft 10 decreases. As a result, outer sleeve 22 and inner sleeve 23 return to tightly fitted state as that in room temperature. At this state, normal prestress is exerted on each of bearings 11 and 12.

It will be appreciated by those skilled in the art that it is possible to mount a second inner sleeve within inner sleeve 23 for increasing an axial extension of inner sleeve 23. A thermal expansion coefficient of the second inner sleeve is selected to be less than that of inner sleeve 23. Hence, preferably, the second inner sleeve is formed of a ceramic material. The fitting procedure of outer sleeve 22, inner sleeve 23, and the second inner sleeve is similar to that of outer sleeve 22 and inner sleeve 23.

The benefits of this invention as compared to prior art include:

1. A prestress reduction of bearings of shafts without degrading a rigidity of bearings is carried out by sleeving components having different thermal expansion coefficients together.

2. No additional complex equipment is needed, resulting in a reduction in the manufacturing and maintenance costs and space saving.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A method for automatically dynamically adjusting prestressed bearings of a shaft comprising the steps of:

a) forming a sleeve assembly comprising an outer sleeve and a first inner sleeve fitted together, b) selecting a thermal expansion coefficient of the outer sleeve larger than that of the first inner sleeve;

c) machining surfaces of the outer and the first inner sleeves for making an inner diameter of the outer sleeve smaller than an outer diameter of the first inner sleeve;

d) heating the outer sleeve at a predetermined temperature for expanding the inner diameter thereof to be larger than the outer diameter of the first inner sleeve prior to putting the outer sleeve onto the first inner sleeve;

e) decreasing temperature of the outer and the first inner sleeves for securing them together; and f) mounting the sleeve assembly onto the shaft prior to sandwiching the sleeve assembly between the bearings, thereby exerting a predetermined prestress on each of the bearings.

2. The method of claim 1, wherein the sleeve assembly further comprises a second inner sleeve fitted within the first inner sleeve, the second inner sleeve having a thermal expansion coefficient less than that of the first inner sleeve.

3. The method of claim 1, wherein the outer sleeve is formed of a brass.

4. The method of claim 1, wherein the first inner sleeve is formed of an Invar alloy.

5. The method of claim 2, wherein the second inner sleeve is formed of a ceramic material.

6. An apparatus for automatically dynamically adjusting prestressed bearings of a shaft comprising a sleeve assembly sandwiched between the bearings and including an outer sleeve and a first inner sleeve fitted together wherein a thermal expansion coefficient of the outer sleeve is larger than that of the first inner sleeve, an inner diameter of the outer sleeve is smaller than an outer diameter of the first inner sleeve, and the outer and the first inner sleeves are secured together at an elevated temperature and cooled to room temperature for compressing the first inner sleeve to extend axially by the outer sleeve, wherein the sleeve assembly further comprises a second inner sleeve fitted within the first inner sleeve, the second inner sleeve having a thermal expansion coefficient less than that of the first inner sleeve.

7. The apparatus of claim 6, wherein the outer sleeve is formed of a brass.

8. The apparatus of claim 6, wherein the first inner sleeve is formed of an Invar alloy.

* * * * *